E. VELTUNG.
RESILIENT TIRE CONSTRUCTION.
APPLICATION FILED AUG. 19, 1919.
1,345,812.
Patented July 6, 1920.
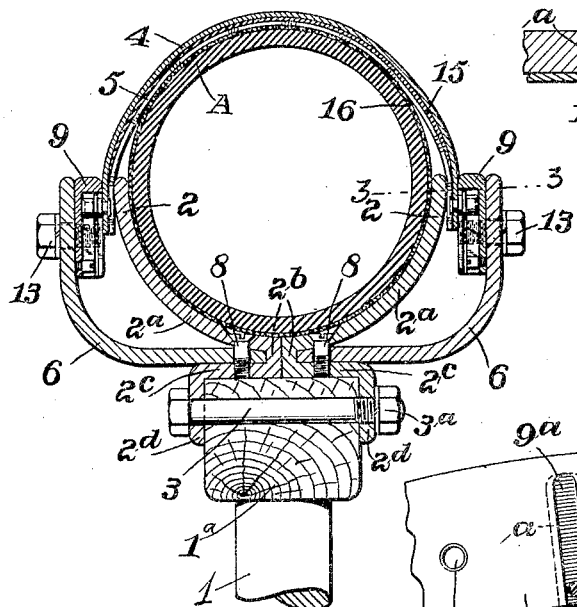
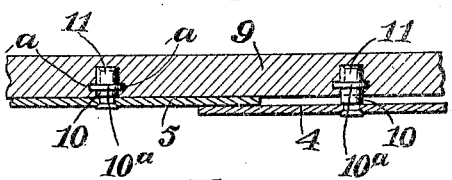
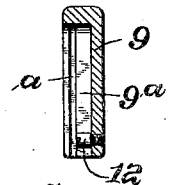
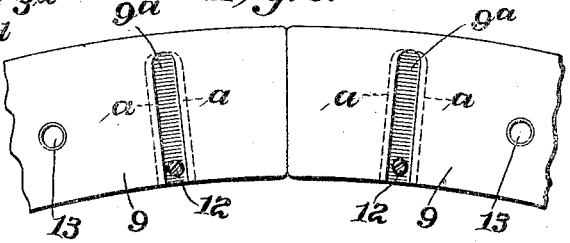
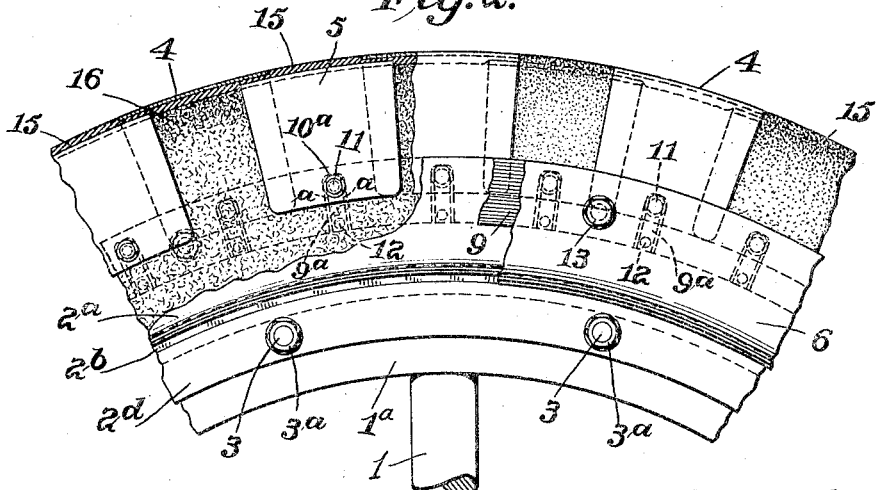
Inventor:
Ernest Veltung,
by Spear, Middleton, Donaldson & Hall
Attys.

UNITED STATES PATENT OFFICE.

ERNEST VELTUNG, OF NEW YORK, N. Y., ASSIGNOR, BY DIRECT AND MESNE ASSIGNMENTS, TO VELTUNG STEEL TIRE COMPANY, A CORPORATION OF DELAWARE.

RESILIENT-TIRE CONSTRUCTION.

1,345,812.      Specification of Letters Patent.      Patented July 6, 1920.

Application filed August 19, 1919. Serial No. 318,444.

*To all whom it may concern:*

Be it known that I, ERNEST VELTUNG, a citizen of the United States, resident of New York, N. Y., have invented certain new and useful Improvements in Resilient-Tire Constructions, of which the following is a specification.

My present invention relates to improvements in resilient tire constructions for vehicle wheels and aims to provide a simple, economical and durable construction which will be non-puncturable and free from rim cutting troubles so frequently experienced with the pneumatic tires now in general use.

A further object is to provide a construction which in case of deflation may be run temporarily without removal of the tire from the rim and without danger of injuring the tire.

Another object is to provide means for sealing the parts against entrance of moisture and dirt and thereby prevent rusting and render the construction less liable to wear.

A further aim is to provide a construction in which a single tube may be used, avoiding the necessity for the double tube or inner tube and outer casing or shoe.

Still another object is to provide a construction which may be readily applied to and removed from a vehicle wheel.

With these and other objects in view the invention includes the novel features of construction and arrangement and combination of parts hereinafter described and particularly defined by the appended claims.

An embodiment of my invention is illustrated in the accompanying drawings, in which:

Figure 1 is a transverse sectional view through a resilient tire, the section being taken along side one of the bolts 3, Fig. 2.

Fig. 2 is a partial side elevation.

Fig. 3 is a partial horizontal section through member 9 and plates 4 and 5 on line 3—3 of Fig. 1.

Fig. 4 is a transverse section through one of said ring sections on the line of one of the recesses or slots $9^a$, and Fig. 5 is a side elevation of the abutting end portions of two ring sections 9.

Referring by reference characters to this drawing the numeral 1 designates a vehicle wheel to which my improved tire is shown applied and which may be of the ordinary or any desired construction, save that it is provided with a plain cylindrical periphery and the felly $1^a$ is provided with transverse bolt holes for the passage of the securing bolts hereinafter described.

Detachably secured to the felly $1^a$ is an annular tire seating or carrying portion 2 formed of two sections which are preferably duplicates of each other. Each comprises a part $2^a$ which has an inner face curved to conform to the surface of the inflatable tube and of an extent to overlie approximately one quarter of the surface of the tube, the two sections when in place upon the rim and in juxtaposition as shown providing an annular channel, approximately semi-circular in cross section. The two sections are further provided with inwardly extending portions $2^b$, at the base of which are located outwardly turned flanges $2^c$, the inner faces of which rest upon the outer periphery of the felly.

My preferable manner of securing the tire seat upon the felly is to provide the sections with inwardly extended annular flanges $2^d$ which embrace the felly between them and to which they are secured by bolts 3 passing through alining openings in the flanges and felly.

The bolts are preferably passed through from the inside of the wheel, and while both sections may be readily removed from the felly, as a matter of fact after installation it is practically never necessary to remove more than the outer section which can be easily and quickly done by unscrewing the nuts $3^a$ and slipping off the corresponding section, leaving the other section and bolts in place.

Within the annular tire seating channel formed by the two sections above described is placed an annular inflatable member which is preferably in the shape of an endless tube 4 of hose material, to wit, of fabric and rubber, or of the character of the single tube tires, such as formerly used.

To protect this against puncture and the wear of the road I provide a protecting armor comprising a plurality of strips of resilient metal indicated at 4 and 5, which are arranged to take the wear of the road and are normally sustained by the pressure of the tube A, but can yield inwardly by reason of their inherent resilience and also by reason of their ends being arranged to have radial sliding movement toward and from the axis of the wheel.

My preferred manner of slidingly connecting said ends is to provide annular side members 6 which have their inner horizontal edge portions inserted in the channels formed between the parts 2ª and 2ᶜ, being held therein by screws 8 inserted through alining openings in the parts and tapped into the parts 2ᶜ.

The screws are, of course, inserted before the air tube is seated in position and the heads are countersunk as shown.

After the tire seat sections 2 and members 6 have been applied the resilient tread members are applied. To enable them to be easily and quickly placed in position and held firmly in use I provide on each side of the tire a sectional carrying and securing ring 9. These rings are preferably composed each of two semicircular segments, which, when assembled form a complete ring, and are provided with radially disposed grooves 9ª, the opposite walls of which are further grooved as indicated at *a*.

To the opposite ends of each resilient member are connected studs 10 which are inserted in the grooves 9ª through the open inner ends thereof, these studs having lateral ribs or flanges 10ª which engage the grooves *a*, the outer ends of the grooves *a* being closed as clearly shown in Figs. 4 and 5.

The inner ends of the studs are reduced and provided with anti-friction rollers 11.

After the studs have been inserted in the grooves they are held therein by screws 12 threaded through the outer walls of the sections 9.

After the tread members have been thus connected to the pairs of segments 9 the latter are inserted from opposite sides of the wheel between the portions 2ª and 6 and secured by locking screws or screw bolts 13 threaded into alining openings in the said parts, the ends of the segments abutting and forming complete rings.

To prevent moisture and dirt from working in between and beneath the tread members I prefer to arrange them in two series, the members being arranged in staggered and overlapping relation, the outer series 4 overlapping the inner series 5, and to provide between these a sealing layer of rubber as indicated at 15.

In assembling the outer members 4 would first be placed in position, their attaching studs being seated in alternate grooves, the rubber sealing sheet or layer would then be placed in position, and thereafter the inner set of members 5 would be secured in place, confining and comprises the rubber between the two sets and sealing the peripheral surface.

As a further protection to the inflatable tube, I prefer to provide it with an exterior covering of asbestos cloth 16.

Having thus described my invention, what I claim is:—

1. In a resilient tire a channel shaped rim, an inflatable tube seated therein, sectional rings located on opposite sides of said rim with means for detachably securing them thereto, said rings having radial grooves open at their inner ends and closed at their outer ends, and resilient tread members having studs seated in said grooves.

2. In a resilient tire a channel shaped rim, an inflatable tube seated therein, sectional rings located on opposite sides of said rim with means for detachably securing them thereto, said rings having radial grooves open at their inner ends and closed at their outer ends, the walls of said grooves having channels therein, resilient tread members overlying said tube, and studs on the ends of said tread members resting in said grooves and having ribs or flanges engaging said channels.

3. In a resilient tire a channel shaped rim, an inflatable tube seated therein, sectional rings located on opposite sides of said rim with means for detachably securing them thereto, said rings having radial grooves open at their inner ends and closed at their outer ends, the walls of said grooves having channels therein, resilient tread members overlying said tube, and studs on the ends of said tread members resting in said grooves and having ribs or flanges engaging said channels, said studs having reduced portions, and anti-friction rollers on said reduced portions.

4. In a resilient tire an annular rim adapted to be secured to a wheel felly and having a peripheral channel, an endless inflatable tube in said channel, said rim having oppositely faced annular grooves, annular rings having laterally extending walls secured in said grooves, and having outwardly extending walls spaced from the channel walls of the rim, sectional rings detachably connected to said annular rings, and resilient tread members having their ends slidably connected to said sectional rings.

5. In a resilient tire an annular rim adapted to be secured to a wheel felly and having a peripheral channel, an endless inflatable tube in said channel, said rim having oppositely faced annular grooves, annular rings having laterally extending walls secured in said grooves, and having outwardly extending walls spaced from the channel walls of the rim, sectional rings detachably connected to said annular rings, said sectional rings having radial grooves in their inner faces open at their inner ends, and resilient tread members overlying said inflatable tube and having studs on their ends slidingly engaging said grooves.

6. In a resilient tire an annular rim adapted to be secured to a wheel felly and having a peripheral channel and outwardly opening lateral annular channels, annular rings having portions secured in said channels and having other portions substantially parallel to but spaced from the channel walls of the rim portion, sectional rings secured to said annular rings between the same and said channel walls, an inflatable tube in said rim channel, and a plurality of resilient tread members having their ends slidably and detachably connected with said sectional rings.

7. In a resilient tire a channeled rim, an endless inflatable tube seated therein, a plurality of transversely arranged resilient sheet metal tread bands arranged in inner and outer layers and overlying said tube, a sheet of rubber interposed between said layers and sealing the joints therebetween against entrance of moisture, and means for securing said tread band in position.

8. In a resilient tire a channeled rim, an endless inflatable tube seated therein, a plurality of transversely arranged resilient tread bands arranged in inner and outer rows, the bands of each row being staggered in relation to those of the other row, a sheet of rubber lying between said rows for sealing the joints thereof, and means for securing the tread bands in position.

In testimony whereof I affix my signature.

ERNEST VELTUNG.